US012097888B2

(12) United States Patent
Maekawa et al.

(10) Patent No.: US 12,097,888 B2
(45) Date of Patent: Sep. 24, 2024

(54) POWER SUPPLY FACILITY FOR ELECTRIC VEHICLES, ELECTRIC VEHICLE, AND POWER SUPPLY METHOD FOR ELECTRIC VEHICLES

(71) Applicant: IHI Corporation, Tokyo (JP)

(72) Inventors: Michisato Maekawa, Tokyo (JP); Kenji Nishimura, Tokyo (JP); Satoshi Yazaki, Tokyo (JP); Naoki Omura, Tokyo (JP); Tomoya Yamamoto, Tokyo (JP)

(73) Assignee: IHI Corporation, Tokyo (JP)

( * ) Notice: Subject to any disclaimer, the term of this patent is extended or adjusted under 35 U.S.C. 154(b) by 426 days.

(21) Appl. No.: 17/698,070

(22) Filed: Mar. 18, 2022

(65) Prior Publication Data

US 2022/0315057 A1 Oct. 6, 2022

(30) Foreign Application Priority Data

Mar. 30, 2021 (JP) ................................. 2021-057075

(51) Int. Cl.
*B60W 60/00* (2020.01)
*B60L 53/126* (2019.01)
(Continued)

(52) U.S. Cl.
CPC ....... *B60W 60/0025* (2020.02); *B60L 53/126* (2019.02); *B60L 53/36* (2019.02);
(Continued)

(58) Field of Classification Search
None
See application file for complete search history.

(56) References Cited

U.S. PATENT DOCUMENTS

2016/0129793 A1* 5/2016 Cronie .................... H02J 50/90
320/109
2019/0039463 A1* 2/2019 Moghe .................... B60L 53/12
(Continued)

FOREIGN PATENT DOCUMENTS

JP 2013-070514 A 4/2013
JP 2013-153564 A 8/2013
(Continued)

*Primary Examiner* — James J Lee
*Assistant Examiner* — David Hatch
(74) *Attorney, Agent, or Firm* — Volpe Koenig

(57) ABSTRACT

A power supply facility includes a wireless communication unit capable of wirelessly communicating with a plurality of electric vehicles traveling in line, a plurality of power supply coils installed at a predetermined interval, and an inter-vehicle calculation unit configured to acquire a plurality of pieces of information including power supply coil interval information indicating a distance of the predetermined interval, information on an entire length of a vehicle body of each of the plurality of electric vehicles, and information on a position of a power reception coil installed in each of the vehicle bodies, and calculate an inter-vehicle distance for leading each of the plurality of electric vehicles to be parked in accordance with the acquired plurality of pieces of information so as to align the plurality of power supply coils with the power reception coils to face each other.

5 Claims, 9 Drawing Sheets

(51) Int. Cl.
  *B60L 53/36*    (2019.01)
  *B60L 53/39*    (2019.01)
  *B60L 53/66*    (2019.01)
  *H02J 50/40*    (2016.01)
  *H02J 50/80*    (2016.01)
  *H02J 50/90*    (2016.01)

(52) U.S. Cl.
  CPC ............... *B60L 53/39* (2019.02); *B60L 53/66* (2019.02); *H02J 50/402* (2020.01); *H02J 50/80* (2016.02); *H02J 50/90* (2016.02)

(56) References Cited

U.S. PATENT DOCUMENTS

| | | | |
|---|---|---|---|
| 2019/0202304 A1* | 7/2019 | Moghe | B60L 53/38 |
| 2020/0174496 A1* | 6/2020 | Hase | H04W 84/20 |
| 2020/0307580 A1* | 10/2020 | Kobayashi | B60W 30/09 |

FOREIGN PATENT DOCUMENTS

| | | |
|---|---|---|
| JP | 2020-087261 A | 6/2020 |
| JP | 2021-078292 A | 5/2021 |

\* cited by examiner

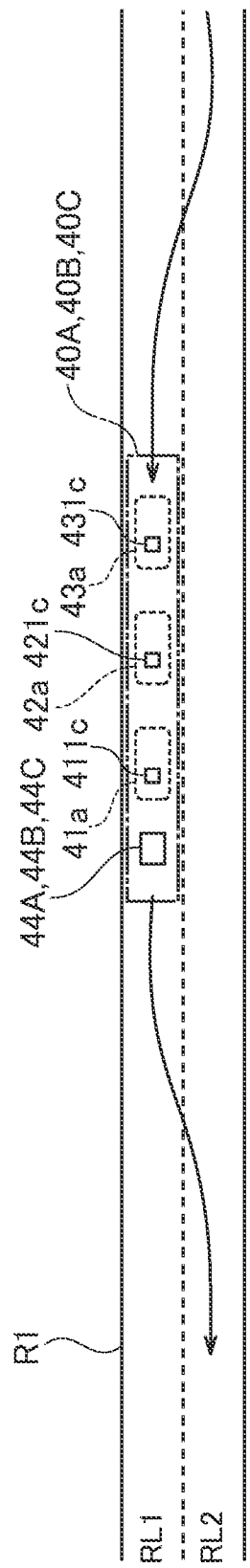
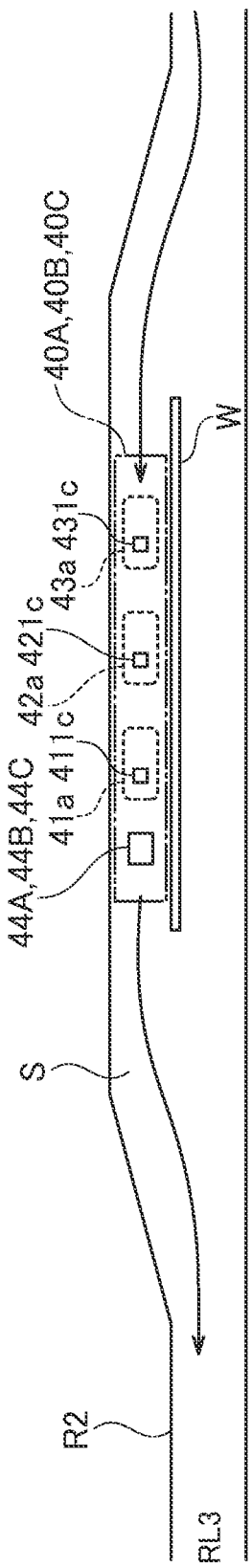

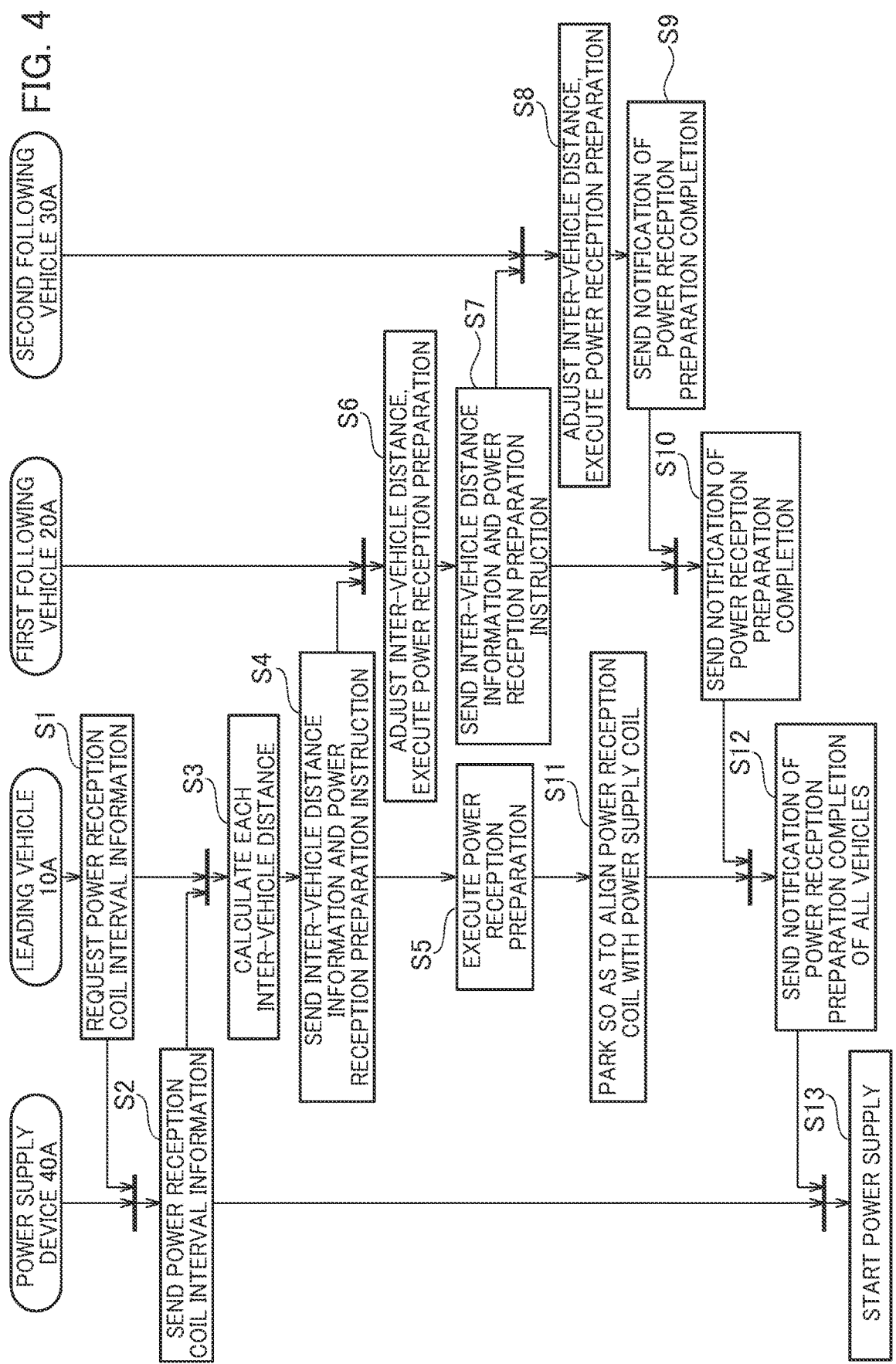

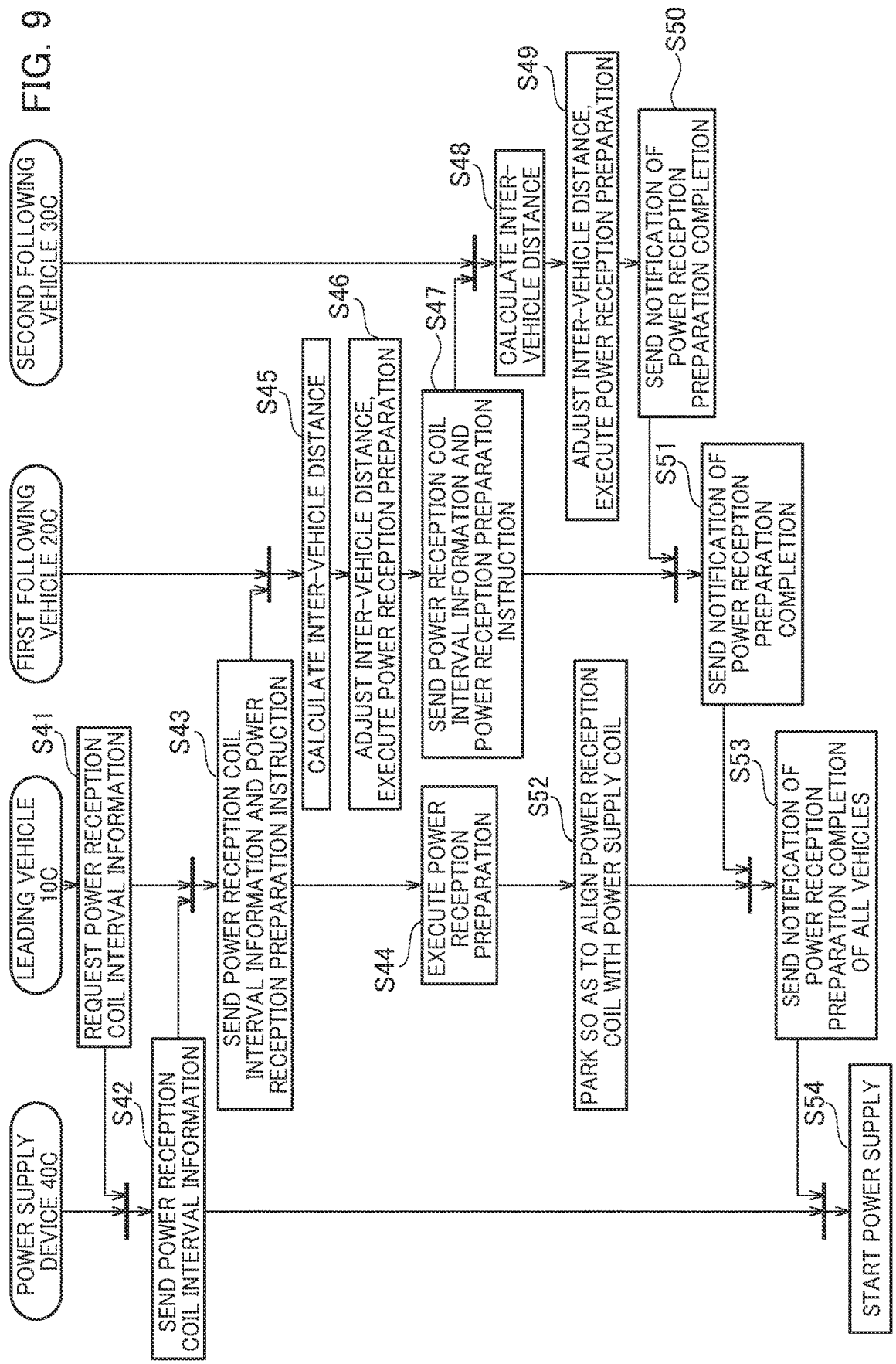

POWER SUPPLY FACILITY FOR ELECTRIC VEHICLES, ELECTRIC VEHICLE, AND POWER SUPPLY METHOD FOR ELECTRIC VEHICLES

CROSS REFERENCE TO RELATED APPLICATIONS

The present application is based on and claims priority from Japanese Patent Application No. 2021-057075 filed on Mar. 30, 2021, the entire contents of which are incorporated herein by reference.

TECHNICAL FIELD

The present disclosure relates to a power supply facility for electric vehicles, an electric vehicle, and a power supply method for electric vehicles.

BACKGROUND

JP 2013-70514 discloses a system in which plural vehicles are each provided with power transmission and reception units on the front and rear sides so as to interchange electric power with the other vehicles traveling in line contiguously in front and behind. This system enables all of the lined-up vehicles to keep traveling by interchanging electric power with each other if any of the electric vehicles traveling in line has a shortage of electric power.

SUMMARY

Such a system, however, still requires the electric vehicles during traveling to receive electric power from a power supply device installed on a road or roadside, since the electric power stored in batteries mounted on the respective electric vehicles runs low during long periods of traveling. When the electric vehicles are to receive electric power from the power supply device, the contiguously traveling electric vehicles temporarily move out of the lined up state (the first step), and the electric vehicles approach the power supply device and align themselves (the second step) so as to start receiving electric power (the third step). The electric vehicles are then again led to be in the lined-up state after the power supply is finished (the fourth step) and start traveling (the fifth step).

The power supply processing through the first to fifth steps described above takes a lot of time and work, and complicates the entire operation.

In view of the foregoing problem, the present disclosure provides a power supply facility for electric vehicles, an electric vehicle, and a power supply method for electric vehicles enabling simultaneous power supply to a plurality of electric vehicles traveling in line, through simple processing while maintaining the lined-up state.

A power supply facility for electric vehicles according to the present disclosure includes a wireless communication unit capable of wirelessly communicating with a plurality of electric vehicles traveling in line, a plurality of power supply coils installed at a predetermined interval so as to enable the plurality of electric vehicles to be parked in line from a front vehicle to an end vehicle and simultaneously supplied with electric power, a memory that stores instructions and a predetermined rule, and a processor that executes the instructions stored in the memory to acquire, by an inter-vehicle calculation unit, a plurality of pieces of information including power supply coil interval information indicating a distance of the predetermined interval, information on an entire length of a vehicle body of each of the plurality of electric vehicles, and information on a position of a power reception coil installed in each of the vehicle bodies, and calculate, by the inter-vehicle calculation unit, an inter-vehicle distance for leading each of the plurality of electric vehicles to be parked in accordance with the acquired plurality of pieces of information so as to align the plurality of power supply coils with the power reception coils to face each other.

The inter-vehicle calculation unit may be provided in any of the plurality of electric vehicles, or may be provided in a device capable of communicating with a power supply circuit unit including one of the plurality of power supply coils and with the plurality of electric vehicles.

An electric vehicle according to the present disclosure capable of traveling in line together with at least one following electric vehicle traveling contiguously behind the electric vehicle, the electric vehicle includes a memory that stores instructions and a predetermined rule, a processor that executes the instructions stored in the memory to acquire, by an inter-vehicle calculation unit, a plurality of pieces of information including power supply coil interval information indicating a distance between a plurality of power supply coils installed at a predetermined interval so as to enable a plurality of electric vehicles parked contiguously in line from a front vehicle to an end vehicle to be simultaneously supplied with electric power, information on an entire length of a vehicle body of each of the electric vehicle and the at least one following electric vehicle, and information on a position of a power reception coil installed in each of the vehicle bodies, and calculate, by the inter-vehicle calculation unit, an inter-vehicle distance for leading the electric vehicle and the at least one following electric vehicle to be parked in accordance with the acquired plurality of pieces of information so as to align the plurality of power supply coils with the power reception coils to face each other, and a wireless communication unit configured to wirelessly send the calculated inter-vehicle distance to the at least one following electric vehicle.

Another electric vehicle according to the present disclosure capable of following a leading vehicle traveling at a forefront of vehicles traveling in line, the electric vehicle includes a memory that stores instructions and a predetermined rule, and a processor that executes the instructions stored in the memory to acquire, by an inter-vehicle calculation unit, a plurality of pieces of information including power supply coil interval information indicating a distance between a plurality of power supply coils installed at a predetermined interval so as to enable a plurality of electric vehicles parked contiguously in line from a front vehicle to an end vehicle to be simultaneously supplied with electric power, information on an entire length of a vehicle body of each of the electric vehicle and another electric vehicle traveling in front of the electric vehicle, and information on a position of a power reception coil installed in each of the vehicle bodies, calculate, by the inter-vehicle calculation unit, an inter-vehicle distance for leading the electric vehicle and the other electric vehicle traveling in line together with the electric vehicle to be parked in accordance with the acquired plurality of pieces of information so as to align the plurality of power supply coils with the power reception coils to face each other, and adjust, by a driving control unit, the inter-vehicle distance to the other electric vehicle by autonomous traveling in accordance with the inter-vehicle distance calculated by the inter-vehicle calculation unit.

A power supply method for electric vehicles according to the present disclosure, includes causing an inter-vehicle calculation unit connected through wireless communication to a plurality of electric vehicles traveling in line to acquire a plurality of pieces of information including power supply coil interval information indicating a distance between a plurality of power supply coils installed at a predetermined interval so as to enable the plurality of electric vehicles to be parked in line from a front vehicle to an end vehicle and simultaneously supplied with electric power, information on an entire length of a vehicle body of each of the plurality of electric vehicles, and information on a position of a power reception coil installed in each of the vehicle bodies, and calculate an inter-vehicle distance for leading each of the plurality of electric vehicles to be parked in accordance with the acquired plurality of pieces of information so as to align the plurality of power supply coils with the power reception coils to face each other, causing a following vehicle, among the plurality of electric vehicles, autonomously traveling and following a leading vehicle to adjust the inter-vehicle distance to an electric vehicle traveling contiguously in front thereof in accordance with the inter-vehicle distance calculated by the inter-vehicle calculation unit, and causing each of the plurality of power supply coils to start supplying electric power to each of the plurality of electric vehicles when the power reception coils and the plurality of power supply coils are aligned to face each other after the leading vehicle among the plurality of electric vehicles is parked so that a first power reception coil of the leading vehicle is aligned with a front power supply coil of the plurality of power supply coils to face each other.

The power supply facility for electric vehicles, the electric vehicle, and the power supply method for electric vehicles enables simultaneous power supply to plural electric vehicles traveling in line, through simple processing while maintaining the lined-up state.

BRIEF DESCRIPTION OF THE DRAWINGS

FIG. 2A and FIG. 2B are views each illustrating an installation example of a power supply device in the power supply facility according to first to third embodiments.

FIG. 4 is a sequence diagram illustrating processing executed for electric vehicles in the power supply facility according to the first embodiment when electric power is supplied to the electric vehicles in the power supply facility.

FIG. 9 is a sequence diagram illustrating processing executed for electric vehicles in the power supply facility according to the third embodiment when electric power is supplied to the electric vehicles in the power supply facility.

DETAILED DESCRIPTION

Some exemplary embodiments are described below with reference to the drawings, in which a power supply facility supplies electric power to a plurality of electric vehicles travelling in line while maintaining this travelling state of the electric vehicles. The power supply facility described below in the embodiments is a facility that wirelessly supplies electric power to batteries mounted on the electric vehicles. The expression "traveling in line" as used herein refers to a state in which the plural electric vehicles are traveling while being lined up in the direction of travel. Each of the electric vehicles 10A, 20A, 30A, 10B, 20B, 30B, 10C, 20C, and 30C, and each of power supply devices 40A, 40B, and 40C described in the following embodiments may include a microcomputer (not illustrated). The microcomputer is a general-purpose microcomputer including a central processing unit (CPU), a memory, and an input and output unit. A computer program including predetermined rules and instructions may be stored in the memory of the microcomputer. The microcomputers included in the respective electric vehicles can control the corresponding vehicle when the computer program is executed. The microcomputers included in the respective power supply devices can control the corresponding power supply device when the computer program is executed.

First Embodiment

[Configuration of Power Supply Facility for Electric Vehicles According to First Embodiment]

Figure 1:
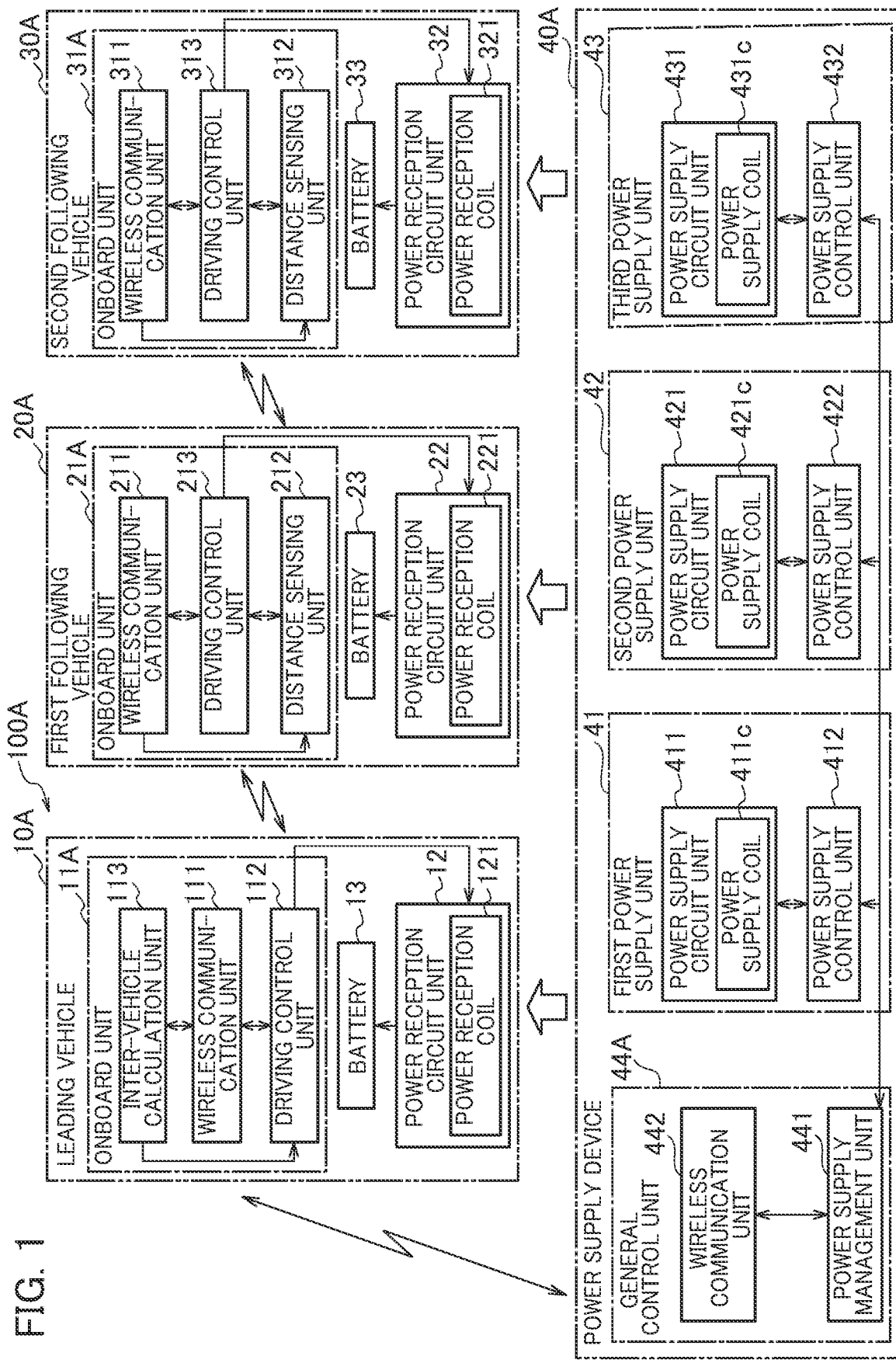
FIG. 1 is a block diagram illustrating a configuration of a power supply facility according to a first embodiment.

A configuration of a power supply facility according to a first embodiment is described below with reference to FIG. 1. The power supply facility 100A according to the present embodiment supplies electric power to a plurality of electric vehicles (a leading vehicle 10A, a first following vehicle 20A, and a second following vehicle 30A) traveling in line while maintaining the lined-up state. The power supply facility 100A includes a power supply device 40A installed in a part of a traveling road along which the electric vehicles are traveling or in an area connected to the traveling road.

A configuration of each of the leading vehicle 10A, the first following vehicle 20A, and the second following vehicle 30A to be supplied with electric power according to the present embodiment is described below. The leading vehicle 10A is driven by a driver riding therein so as to travel together with at least one following electric vehicle (the two vehicles of the first following vehicle 20A and the second following vehicle 30A in the present embodiment) traveling contiguously behind the leading vehicle 10A. The leading vehicle 10A includes an onboard unit 11A, a power reception circuit unit 12, and a battery 13. The onboard unit 11A includes a wireless communication unit 111, a driving control unit 112, and an inter-vehicle calculation unit 113.

The wireless communication unit 111 wirelessly communicates with the power supply device 40A and the first following vehicle 20A traveling contiguously behind the leading vehicle 10A. The driving control unit 112 executes the driving control of the host vehicle 10A. The inter-vehicle calculation unit 113 calculates an inter-vehicle distance between the leading vehicle 10A and the first following vehicle 20A and an inter-vehicle distance between the first following vehicle 20A and the second following vehicle 30A. The power reception circuit unit 12 includes a power reception coil 121 and is mounted on a lower surface of the leading vehicle 10A so as to wirelessly receive electric power from the power supply device 40A. The battery 13 is charged to store the electric power received by the power reception circuit unit 12.

The first following vehicle 20A is a driverless vehicle that autonomously follows behind the leading vehicle 10A, and includes an onboard unit 21A, a power reception circuit unit 22, and a battery 23. The onboard unit 21A includes a wireless communication unit 211, a distance sensing unit 212, and a driving control unit 213. The wireless communication unit 211 wirelessly communicates with the leading vehicle 10A and the second following vehicle 30A traveling in line contiguous to the first following vehicle 20A. The distance sensing unit 212 measures the distance to the leading vehicle 10A traveling immediately ahead of the first following vehicle 20A. The driving control unit 213 executes the driving control of the host vehicle 20A. The power reception circuit unit 22 includes a power reception coil 221 and is mounted on a lower surface of the first following vehicle 20A so as to wirelessly receive electric power from the power supply device 40A. The battery 23 is charged to store the electric power received by the power reception circuit unit 22.

The second following vehicle 30A is a driverless vehicle that autonomously follows behind the first following vehicle 20A, and includes an onboard unit 31A, a power reception circuit unit 32, and a battery 33. The onboard unit 31A includes a wireless communication unit 311, a distance sensing unit 312, and a driving control unit 313. The wireless communication unit 311 wirelessly communicates with the first following vehicle 20A traveling in line contiguous to the second following vehicle 30A. The distance sensing unit 312 measures the distance to the first following vehicle 20A traveling immediately ahead of the second following vehicle 30A. The driving control unit 313 executes the driving control of the host vehicle 30A. The power reception circuit unit 32 includes a power reception coil 321 and is mounted on a lower surface of the second following vehicle 30A so as to wirelessly receive electric power from the power supply device 40A. The battery 33 is charged to store the electric power received by the power reception circuit unit 32.

The power supply device 40A includes a plurality of power supply units (a first power supply unit 41, a second power supply unit 42, and a third power supply unit 43) installed at predetermined intervals on a traveling road R1 or R2 along a traveling route of the electric vehicles, for example, as illustrated in FIG. 2A and FIG. 2B, and a general control unit 44A. FIG. 2A and FIG. 2B each indicate, by reference numeral 41a, a power supply space at which a corresponding vehicle is parked to receive the electric power from the first power supply unit 41. FIG. 2A and FIG. 2B each also indicate, by reference numeral 42a, a power supply space at which a corresponding vehicle is parked to receive the electric power from the second power supply unit 42. FIG. 2A and FIG. 2B each also indicate, by reference numeral 43a, a power supply space at which a corresponding vehicle is parked to receive the electric power from the third power supply unit 43.

The first power supply unit 41, the second power supply unit 42, and the third power supply unit 43 are arranged at the predetermined intervals so as to enable the electric vehicles parked in line to receive the electric power from the front of the line to the end. The interval between the first power supply unit 41 and the second power supply unit 42 and the interval between the second power supply unit 42 and the third power supply unit 43 are each set to a distance enabling the electric vehicles to be parked in line, specifically, the sum of the length of an electric vehicle in the front-rear direction and a margin. The interval between the first power supply unit 41 and the second power supply unit 42 and the interval between the second power supply unit 42 and the third power supply unit 43 may be the same or different from each other.

FIG. 2A illustrates a case in which the power supply device 40A is installed in a parking lane RL1 on the traveling road R1 including the parking lane RL1 and a traveling lane RL2. In the situation in which the power supply device 40A is installed as described above, the vehicles 10A, 20A, and 30A having been traveling in the traveling lane RL2 change the current traveling lane to the parking lane RL1, as indicated by the arrow, when approaching the installed position of the power supply device 40A. The vehicles 10A, 20A, and 30A are then parked at the corresponding power supply spaces 41a, 42a, and 43a so as to receive electric power. After the power supply is finished, the vehicles 10A, 20A, and 30A again start traveling while changing the current traveling lane to the traveling lane RL2, as indicated by the arrow.

FIG. 2B illustrates a case in which a power supply space S partitioned by curbstones or a wall W from a traveling lane RL3 is provided in a partial section on the traveling road R2, and the power supply device 40A is installed in the power supply space S. In the situation in which the power supply device 40A is installed as described above, the vehicles 10A, 20A, and 30A having been traveling in the traveling lane RL3 enter the power supply space S, as indicated by the arrow, when approaching the installed position of the power supply device 40A. The vehicles 10A, 20A, and 30A are then parked at the corresponding power supply spaces 41a, 42a, and 43a so as to receive electric power. After the power supply is finished, the vehicles 10A, 20A, and 30A leave the power supply space S and return to the traveling lane RL3 so as to start traveling again, as indicated by the arrow.

The first power supply unit 41 includes a power supply circuit unit 411 and a power supply control unit 412. The power supply circuit unit 411 includes a power supply coil 411c that is magnetically coupled with the corresponding power reception coil of the power reception circuit unit mounted on the electric vehicle to be supplied with power, so as to wirelessly supply electric power in accordance with the control by the power supply control unit 412. The power supply control unit 412 switches the power supply by the power supply circuit unit 411 between ON and OFF states in accordance with instructions sent from the general control unit 44A described below. The second power supply unit 42 and the third power supply unit 43 have the same configuration as the first power supply unit 41, and specific explanations thereof are not repeated below.

The general control unit 44A includes a power supply management unit 441 and a wireless communication unit 442. The power supply management unit 441 stores power supply coil interval information indicating a distance between the center of the power supply coil 411c of the first power supply unit 41 and the center of the power supply coil 421c of the second power supply unit 42 and a distance between the center of the power supply coil 421c of the second power supply unit 42 and the center of the power supply coil 431c of the third power supply unit 43 in the power supply device 40A. The distance between the center of the power supply coil 411c and the center of the power supply coil 421c may be either the same as or different from the distance between the center of the power supply coil 421c and the center of the power supply coil 431c. When the distances are the same, the power supply coil interval information is a single piece of information. When the distances are different from each other, the power supply coil interval information includes plural pieces of information stored in an arrayed manner each including the distance between the respective power supply coils.

The power supply management unit 441, when receiving a request for the power supply coil interval information from an electric vehicle to be supplied with power, provides the power supply coil interval information stored therein. The power supply management unit 441 also controls the operations of the first power supply unit 41, the second power supply unit 42, and the third power supply unit 43. The wireless communication unit 442 wirelessly communicates with the leading vehicle 10A to be supplied with power.

[Operations Executed in Power Supply Facility for Electric Vehicles According to First Embodiment]

The operations executed in the power supply facility 100A according to the present embodiment are described below with the case where electric power is supplied to the leading vehicle 10A, the first following vehicle 20A, and the third following vehicle 30A traveling in line in this order.

Figure 3A:
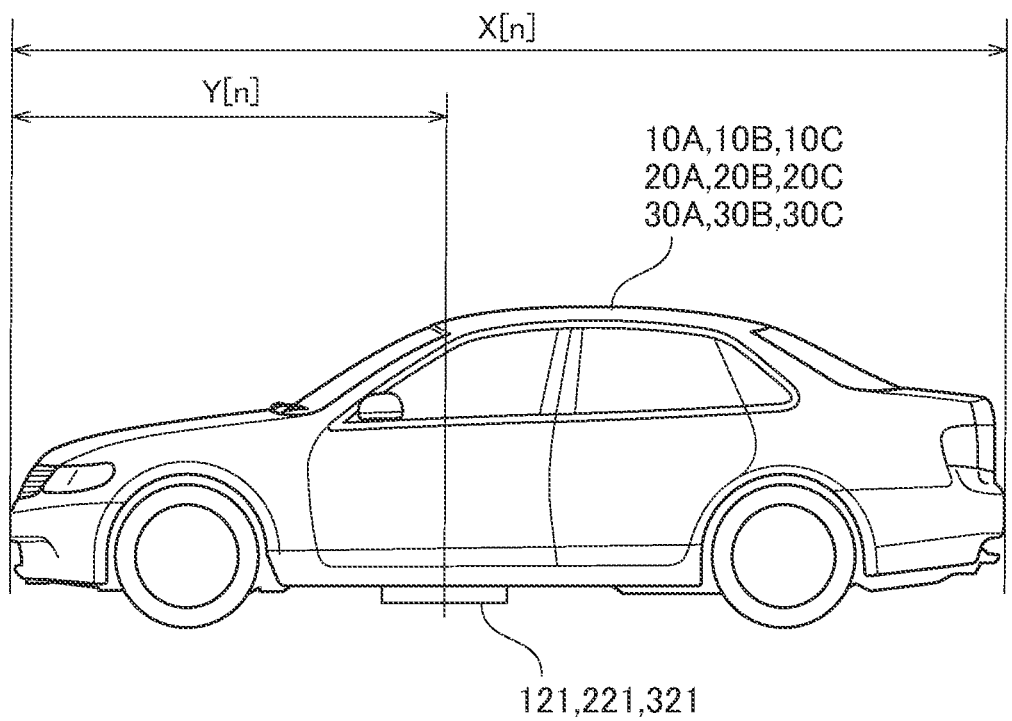
FIG. 3A is a side view of an electric vehicle that receives electric power in the power supply facility according to the first to third embodiments.

The inter-vehicle calculation unit 113 of the onboard unit 11A of the leading vehicle 10A preliminarily stores a plurality of pieces of information including information on the number of the vehicles traveling in line including the host vehicle 10A, which is "three" in this case, and information on an entire length X[n] of the vehicle body of each of the vehicles 10A, 20A, and 30A and a distance Y[n] from the front end of the vehicle body to the center of each of the power reception coils 121, 221, and 321, as illustrated in FIG. 3A. The reference sign [n] as used herein refers to the order in which the vehicles are traveling in line from the leading vehicle 10A. The leading vehicle 10A is assigned n=1, the first following vehicle 20A is assigned n=2, and the second following vehicle 30A is assigned n=3.

Figure 3B:
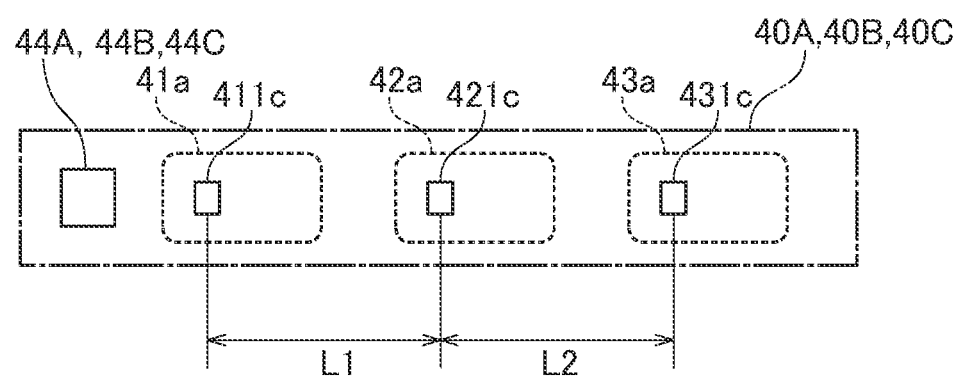
FIG. 3B is a view illustrating intervals between power supply units in the power supply device in the power supply facility according to the first to third embodiments.

The power supply management unit 441 of the power supply device 40A also preliminarily stores, as the power supply coil interval information, information on the distance L1 between the center of the power supply coil 411c of the first power supply unit 41 and the center of the power supply coil 421c of the second power supply unit 42 and the distance L2 between the center of the power supply coil 421c of the second power supply unit 42 and the center of the power supply coil 431c of the third power supply unit 43, as illustrated in FIG. 3B.

When the vehicles 10A, 20A, and 30A traveling in line are to be supplied with electric power, the driver of the leading vehicle 10A drives toward the installed position of the power supply device 40A while maintaining the lined-up state so that the first following vehicle 20A and the second following vehicle 30A follow the leading vehicle 10A. The processing executed for the vehicles 10A, 20A, and 30A and the power supply device 40A when the vehicles 10A, 20A, and 30A enter the area equipped with the power supply device 40A to receive electric power is described below with reference to the sequence diagram illustrated in FIG. 4.

When the leading vehicle 10A approaches the power supply device 40A, the inter-vehicle calculation unit 113 of the onboard unit 11A sends a request for the power supply coil interval information to the power supply device 40A via the wireless communication unit 111 (step S1). The inter-vehicle calculation unit 113 also sends, together with the request, the preliminarily-stored information on the number of the vehicles traveling in line, which is "three", as the information on the number of the vehicles to be supplied with power. The power supply management unit 441 in the power supply device 40A receives the request for the power supply coil interval information and the information on the number of the vehicles to be supplied with power, via the wireless communication unit 442.

The power supply management unit 441 sends the stored power supply coil interval information to the leading vehicle 10A in response to the received request for the power supply coil interval information (step S2). The inter-vehicle calculation unit 113 of the onboard unit 11A in the leading vehicle 10A acquires the power supply coil interval information sent from the power supply device 40A, and calculates an inter-vehicle distance CL1 (refer to FIG. 5) between the leading vehicle 10A and the first following vehicle 20A and an inter-vehicle distance CL2 (refer to FIG. 5) between the first following vehicle 20A and the second following vehicle 30A (step S3). The inter-vehicle distances CL1 and CL2 are information for parking the vehicles 10A, 20A, and 30A while aligning the power supply coils 411c, 421c and 431c with the power reception coils 121, 221, and 321 of the respective electric vehicles 10A, 20A, and 30A so as to face each other.

The calculation of the inter-vehicle distances executed by the inter-vehicle calculation unit 113 is described in more detail below. The inter-vehicle calculation unit 113 calculates the inter-vehicle distances CL1 and CL2 in accordance with the information (X[n] and Y[n] of the each vehicle) preliminarily stored and the acquired power supply coil interval information (L1 and L2).

When the leading vehicle 10A, the first following vehicle 20A, and the second following vehicle 30A have the same shape, namely, when the conditions of $X[1]=X[2]=X[3]$ and $Y[1]=Y[2]=Y[3]$ are met, the inter-vehicle distances CL1 and CL2 are calculated as follows. The inter-vehicle distance CL1 between the leading vehicle 10A and the first following vehicle 20A is the interval between the rear end of the leading vehicle 10A and the front end of the first following vehicle 20A, which is calculated according to the expression: $L1-X[1]$ ($=X[2]=X[3]$). The inter-vehicle distance CL2 between the first following vehicle 20A and the second following vehicle 30A is the interval between the rear end of the first following vehicle 20A and the front end of the second following vehicle 30A, which is calculated according to the expression: $L2-X[1]$ ($=X[2]=X[3]$).

When the leading vehicle 10A, the first following vehicle 20A, and the second following vehicle 30A have shapes different from each other, namely, when the conditions of $X[1] \neq X[2] \neq X[3]$ and $Y[1] \neq Y[2] \neq Y[3]$ are met, the inter-vehicle distances CL1 and CL2 are calculated as follows. The inter-vehicle distance CL1 between the leading vehicle 10A and the first following vehicle 20A, which is the interval between the rear end of the leading vehicle 10A and the front end of the first following vehicle 20A, is calculated according to the expression: $L1-X[1]+Y[1] - Y[2]$. The inter-vehicle distance CL2 between the first following vehicle 20A and the second following vehicle 30A, which is the interval between the rear end of the first following vehicle 20A and the front end of the second following vehicle 30A, is calculated according to the expression: $L2-X[2]+Y[2]-Y[3]$.

The inter-vehicle calculation unit 113, after calculating the inter-vehicle distances CL1 and CL2, wirelessly sends information on the inter-vehicle distances CL1 and CL2 together with a power reception preparation instruction to the first following vehicle 20A via the wireless communication unit 111 (step S4). The driving control unit 112 then starts up the power reception circuit unit 12 to execute power reception preparation processing (step S5).

The first following vehicle 20A, when acquiring the information on the inter-vehicle distances CL1 and CL2, extracts, from the acquired information, the information on the inter-vehicle distance CL1 corresponding to the lined-up order of the host vehicle 20A (which is the second) among the vehicles (10A, 20A, and 30A) traveling in line. The driving control unit 213 then changes the traveling speed while autonomously traveling in accordance with the information measured by the distance sensing unit 212 so as to adjust the speed of the host vehicle 20A to maintain the inter-vehicle distance CL1 to the leading vehicle 10A. In particular, the inter-vehicle distance decreases as the traveling speed is increased, and the inter-vehicle distance increases as the traveling speed is decreased.

The driving control unit 213 also starts up the power reception circuit unit 22 to execute the power reception preparation processing in accordance with the acquired power reception preparation instruction (step S6). The driving control unit 213 then wirelessly sends the acquired information on the inter-vehicle distances CL1 and CL2 together with the power reception preparation instruction to the second following vehicle 30A via the wireless communication unit 211 (step S7).

The second following vehicle 30A, when acquiring the information on the inter-vehicle distances CL1 and CL2, extracts, from the acquired information, the information on the inter-vehicle distance CL2 corresponding to the lined-up order of the host vehicle 30A (which is the third) among the vehicles (10A, 20A, and 30A) traveling in line. The driving control unit 313 then changes the traveling speed while autonomously traveling in accordance with the information measured by the distance sensing unit 312 so as to adjust the speed of the host vehicle 30A to maintain the inter-vehicle distance CL2 to the first following vehicle 20A.

The driving control unit 313 also starts up the power reception circuit unit 32 to execute the power reception preparation processing in accordance with the acquired power reception preparation instruction (step S8). The driving control unit 313 then sends notification of power reception preparation completion to the first following vehicle 20A when detecting the completion of the power reception preparation processing executed by the power reception circuit unit 32 (step S9).

The driving control unit 213 in the first following vehicle 20A receives the notification of the power reception preparation completion sent from the second following vehicle 30A. The driving control unit 213 then notifies the leading vehicle 10A of the power reception preparation completion of each of the second following vehicle 30A and the first following vehicle 20A when detecting the completion of the power reception preparation processing executed by the power reception circuit unit 22 of the host vehicle 20A (step S10).

In parallel with the processing executed in steps S1 to S10, the driver of the leading vehicle 10A parks his/her own vehicle 10A in the power supply space 41a while aligning the power reception coil 121 of the power reception circuit unit 12 of the leading vehicle 10A with the power supply coil 411c of the power supply circuit unit 411 of the first power supply unit 41 so as to face each other (step S11). The surface of the road corresponding to the power supply space 41a is provided with a box-shaped marking drawn thereon, for example, so that the electric vehicle to be supplied with power is led to be parked at a position enabling the electric vehicle to receive electric power appropriately. The driver of the leading vehicle 10A aligns a predetermined position of the leading vehicle 10A (for example, the front end of the vehicle body) with the box-shaped marking, so as to park the leading vehicle 10A with the power reception coil 121 positioned to face the power supply coil 411c.

Figure 5:
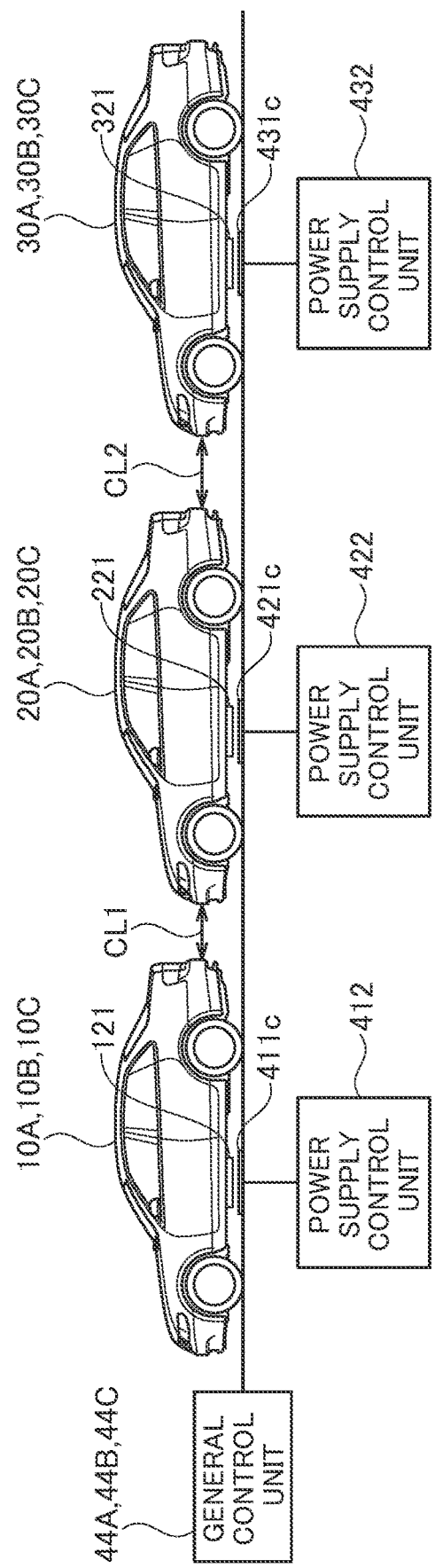
FIG. 5 is a side view illustrating a state in which the electric vehicles are parked at positions corresponding to the respective power supply units in the power supply facility according to the first to third embodiment.

In the present embodiment, the leading vehicle 10A is presumed to be parked in the power supply space 41a after the second following vehicle 30A adjusts the inter-vehicle distance CL2 to the first following vehicle 20A in step S8. The leading vehicle 10A, the first following vehicle 20A, and the second following vehicle 30A at this point maintain the lined-up state while the inter-vehicle distance between the leading vehicle 10A and the first following vehicle 20A is maintained at CL1 and the inter-vehicle distance between the first following vehicle 20A and the second following vehicle 30A is maintained at CL2. This leads the first following vehicle 20A to be autonomously parked so that the power reception coil 221 of the first following vehicle 20A and the power supply coil 421c of the second power supply unit 42 are positioned to face each other in the vertical direction, and leads the second following vehicle 30A to be autonomously parked so that the power reception coil 321 of the second following vehicle 30A and the power supply coil 431c of the third power supply unit 43 are positioned to face each other in the vertical direction, as illustrated in FIG. 5.

The driving control unit 112 in the leading vehicle 10A receives the notification of the power reception preparation completion of the second following vehicle 30A and the power reception preparation completion of the first following vehicle 20A each sent from the first following vehicle 20A. The driving control unit 112 then sends notification of the power reception preparation completion of all of the vehicles to the power supply device 40A when receiving the notification of the power reception preparation completion of the respective following vehicles 20A and 30A after the power reception preparation processing and the parking operation of the host vehicle 10A in the power supply space 41a are both completed (step S12). The notification of the power reception preparation completion of all of the vehicles indicates that all of the vehicles 10A, 20A, and 30A have been parked at the respective predetermined positions to complete the power reception preparation.

The power supply management unit 441 in the power supply device 40A receives the notification of the power reception preparation completion of all of the vehicles sent from the leading vehicle 10A. The power supply management unit 441 then sends a power supply start instruction to the number of power supply units from the first power supply unit 41 that correspond to the number of vehicles to be supplied with power, among the power supply units 41, 42, and 43 when receiving the notification of the power reception preparation completion of all of the vehicles. Since the number of the vehicles to be supplied with power is three in this case, the power supply management unit 441 sends the power supply start instruction to each of the power supply control unit 412 of the first power supply unit 41, the power supply control unit 422 of the second power supply unit 42, and the power supply control unit 432 of the third power supply unit 43. When the number of the vehicles to be supplied with power is larger than the number (m) of the power supply units, power is supplied only for the m-number of the vehicles counted from the front among the plural vehicles lined up. The power supply control unit 412 after receiving the power supply start instruction starts up the power supply circuit unit 411 to start executing the power supply processing. Similarly, the power supply control unit 422 starts up the power supply circuit unit 421 to start executing the power supply processing, and the power supply control unit 432 starts up the power supply circuit unit 431 to start executing the power supply processing (step S13).

When the power supply circuit unit 411 starts the power supply processing, the power reception circuit unit 12 of the leading vehicle 10A receives the electric power so as to start charging the battery 13. When the power supply circuit unit 421 starts the power supply processing, the power reception circuit unit 22 of the first following vehicle 20A receives the electric power so as to start charging the battery 23. When the power supply circuit unit 431 starts the power supply processing, the power reception circuit unit 32 of the second following vehicle 30A receives the electric power so as to start charging the battery 33.

After a predetermined condition is satisfied (for example, a predetermined period of time has elapsed, or the battery 13 of the leading vehicle 10A is fully charged), the power supply management unit 441 of the general control unit 44A instructs the power supply control units 412, 422, and 432 of the respective power supply units 41, 42, and 43 to stop the power supply. The power supply control units 412, 422, and 432 stop the power supply processing when receiving the instruction to stop the power supply.

When the driver of the leading vehicle 10A starts traveling after the power supply processing has stopped, the first following vehicle 20A and the second following vehicle 30A start following the leading vehicle 10A so as to maintain the lined-up state of the leading vehicle 10A, the first following vehicle 20A, and the second following vehicle 30A traveling contiguously in this order. After the start of traveling, the vehicles do not necessarily have to maintain the intervals therebetween calculated in step S3, but only need to keep traveling while regulating the intervals to be appropriate for the corresponding traveling situation. For example, when the vehicles travel on an express way, the intervals between the vehicles are set to be longer.

The power supply facility 100A, the leading vehicle 10A, and the following vehicles 20A and 30A described above in the first embodiment can implement a power supply system suitable for supplying power to the leading vehicle 10A and the following vehicles 20A and 30A travelling in line while maintaining this travelling state of the vehicles in the power supply facility 100A.

According to the first embodiment described above, the configuration enabling the plural electric vehicles traveling in line to be supplied with electric power simultaneously while maintaining the lined-up state does not require a process for causing the vehicles to temporarily move out of the lined up state to be supplied with power and causing the vehicles to line up again, and it is therefore possible to reduce the time necessary for the entire processing. When the vehicles are parked to be supplied with power, it is only necessary to execute the step of aligning the leading vehicle with the parking position with respect to the power supply space, and the other following vehicles can be parked appropriately at the positions corresponding to the respective power supply units by simply following the leading vehicle and maintaining the predetermined inter-vehicle distances therebetween. This configuration enables the plural electric vehicles to be parked simultaneously at the appropriate power supply positions through simple processing.

Since the present embodiment uses the wireless power supply system for supplying the electric power to the electric vehicles without executing any cable connecting operations when power is to be supplied, the driver in the manually-driven electric vehicle does not need to get out of the vehicle, nor does any operator need to go down to the driverless electric vehicles. The present embodiment thus can supply power for all of the plural electric vehicles in an automated manner.

Second Embodiment

[Configuration of Power Supply Facility for Electric Vehicles According to Second Embodiment]

Figure 6:
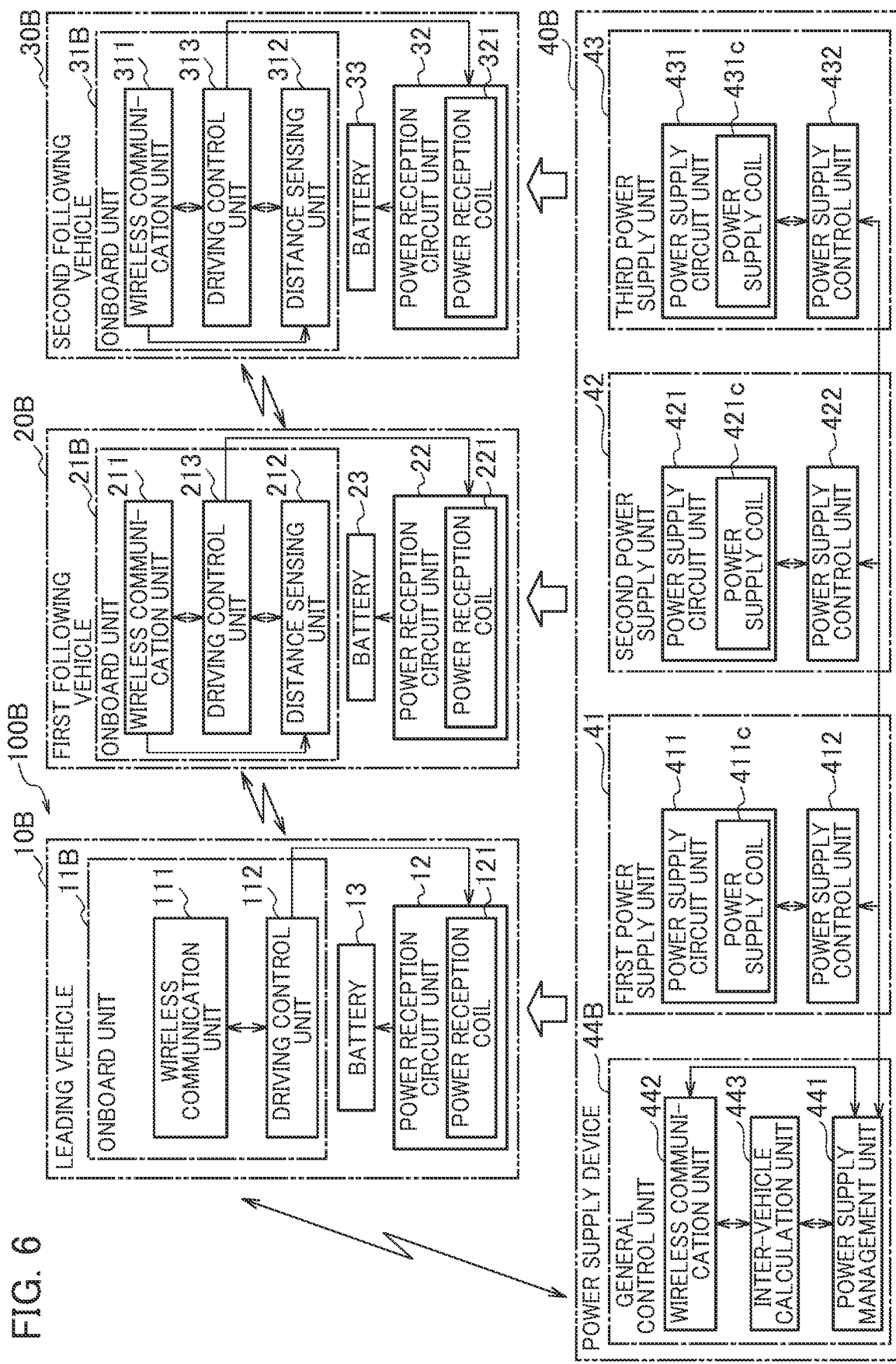
FIG. 6 is a block diagram illustrating a configuration of the power supply facility according to the second embodiment.

A configuration of a power supply facility according to a second embodiment is described below with reference to FIG. 6. The power supply facility 100B according to the present embodiment differs from the power supply facility 100A according to the first embodiment in including an inter-vehicle calculation unit 443 in the general control unit 44B of the power supply unit 44B, instead of including the inter-vehicle calculation unit 113 in the leading vehicle 10A. The other configurations are the same as those in the power supply facility 100A described in the first embodiment, and specific explanations regarding the elements having the same functions as those in the power supply facility 100A are not repeated below.

[Operations Executed in Power Supply Facility for Electric Vehicles According to Second Embodiment]

The operations executed in the power supply facility 100B according to the present embodiment are described below with the case where electric power is supplied to the leading vehicle 10B, the first following vehicle 20B, and the third following vehicle 30B traveling in line in this order. The leading vehicle 10B includes the onboard unit 11B, the power reception circuit unit 12, and the battery 13. The onboard unit 11B includes the wireless communication unit 111 and the driving control unit 112. The first following vehicle 20B includes the onboard unit 21B, the power reception circuit unit 22, and the battery 23. The onboard unit 21B includes the wireless communication unit 211, the distance sensing unit 212, and the driving control unit 213. The second following vehicle 30B includes the onboard unit 31B, the power reception circuit unit 32, and the battery 33. The onboard unit 31B includes the wireless communication unit 311, the distance sensing unit 312, and the driving control unit 313.

Figure 7:
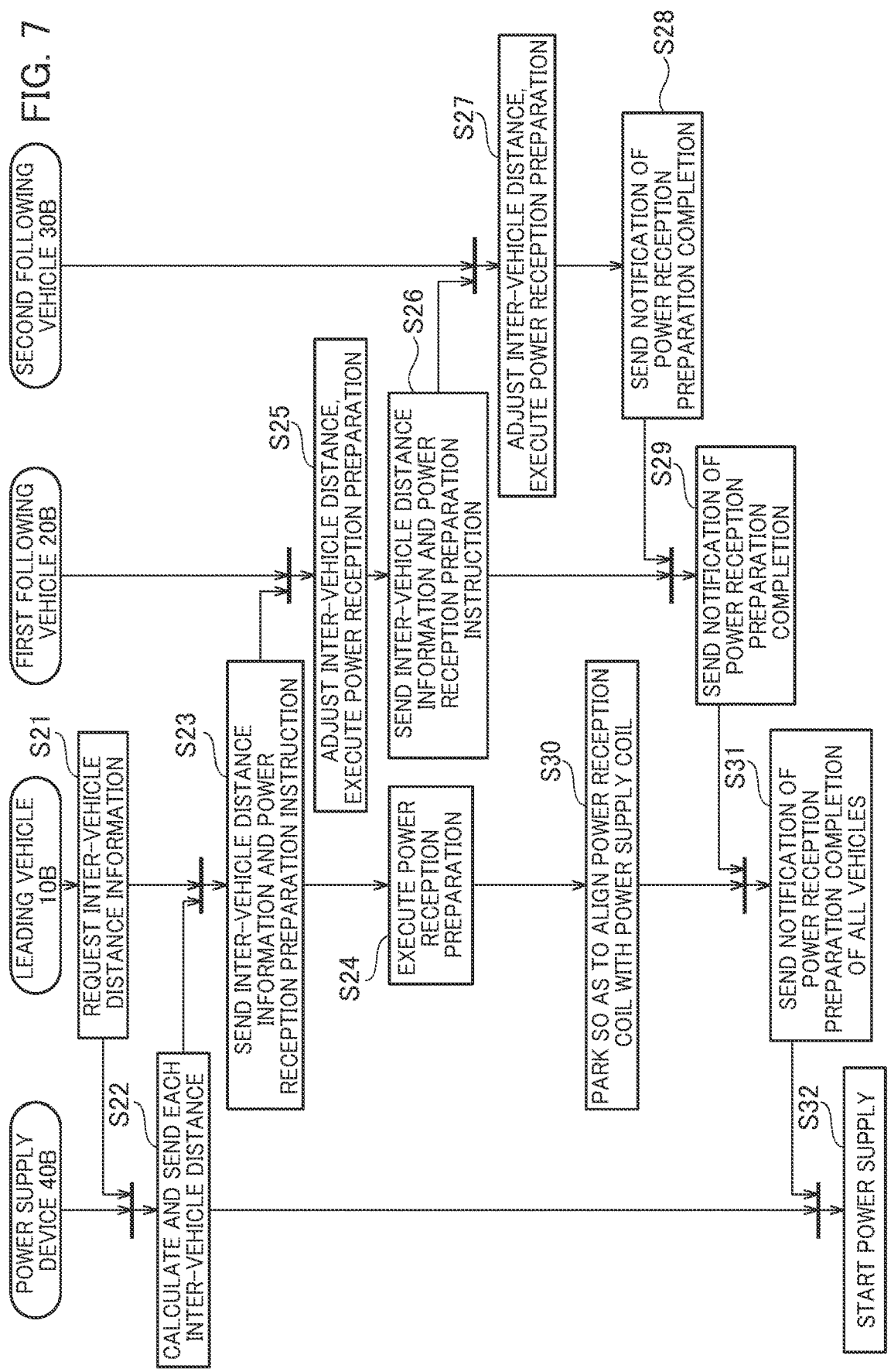
FIG. 7 is a sequence diagram illustrating processing executed for electric vehicles in the power supply facility according to the second embodiment when electric power is supplied to the electric vehicles in the power supply facility.

The operations executed in the power supply facility 100B according to the present embodiment are described below with reference to the sequence diagram illustrated in FIG. 7. The driving control unit 112 of the onboard unit 11B of the leading vehicle 10B preliminarily stores a plurality of pieces of information including information on the number of the vehicles traveling in line, which is "three" in this case, and information on the entire length X[n] of each of the vehicles 10B, 20B, and 30B and the distance Y[n] from the front end of each of the vehicles 10B, 20B, and 30B to the center of the respective power reception coils 121, 221, and 321.

The inter-vehicle calculation unit 443 preliminarily stores, as the power supply coil interval information, information on the distance L1 between the center of the power supply coil 411c of the first power supply unit 41 and the center of the power supply coil 421c of the second power supply unit 42 and the distance L2 between the center of the power supply coil 421c of the second power supply unit 42 and the center of the power supply coil 431c of the third power supply unit 43.

In the present embodiment, when the leading vehicle 10B, the first following vehicle 20B, and the second following vehicle 30B traveling in line are to be supplied with electric power, the driver of the leading vehicle 10B drives toward the installed position of the power supply device 40B, and the first following vehicle 20B and the second following vehicle 30B follow the leading vehicle 10B.

When the respective vehicles 10B, 20B, and 30B approach the power supply device 40B, the driving control unit 112 of the onboard unit 11B of the leading vehicle 10B sends the request for the inter-vehicle distance information to the power supply device 40B via the wireless communication unit 111 (step S21). The driving control unit 112 also sends, together with the request, the preliminarily-stored information on the number of the vehicles traveling in line, which is "three", and the information on the entire length X[n] of each of the vehicles 10B, 20B, and 30B and the distance Y[n] from the front end of each of the vehicles 10B, 20B, and 30B to the center of the respective power reception coils 121, 221, and 321.

The inter-vehicle calculation unit 443 in the power supply device 40B receives the information sent from the leading vehicle 10B via the wireless communication unit 442. The inter-vehicle calculation unit 443 then calculates the inter-vehicle distance CL1 between the leading vehicle 10B and the first following vehicle 20B and the inter-vehicle distance CL2 between the first following vehicle 20B and the second following vehicle 30B in accordance with the information acquired from the leading vehicle 10B and the power supply coil interval information preliminarily stored. The inter-vehicle calculation unit 443 sends the calculated respective inter-vehicle distances CL1 and CL2 to the leading vehicle 10B (step S22).

The processing in steps S23 to S32 executed after the inter-vehicle calculation unit 443 calculates the inter-vehicle distances and the leading vehicle 10B acquires information on the inter-vehicle distances CL1 and CL2 is the same as that in steps S4 to S13 described in the first embodiment, and specific explanations are not repeated below.

The power supply facility 100B, the leading vehicle 10B, and the respective following vehicles 20B and 30B described above in the second embodiment can implement a power supply system suitable for supplying power to the leading vehicle 10B and the following vehicles 20B and 30B travelling in line while maintaining this travelling state of the vehicles in the power supply facility 100B.

The second embodiment described above can achieve effects similar to those in the first embodiment while contributing to reducing the load of the calculation processing performed by the leading vehicle 10B.

Third Embodiment

[Configuration of Power Supply Facility for Electric Vehicles According to Third Embodiment]

Figure 8:
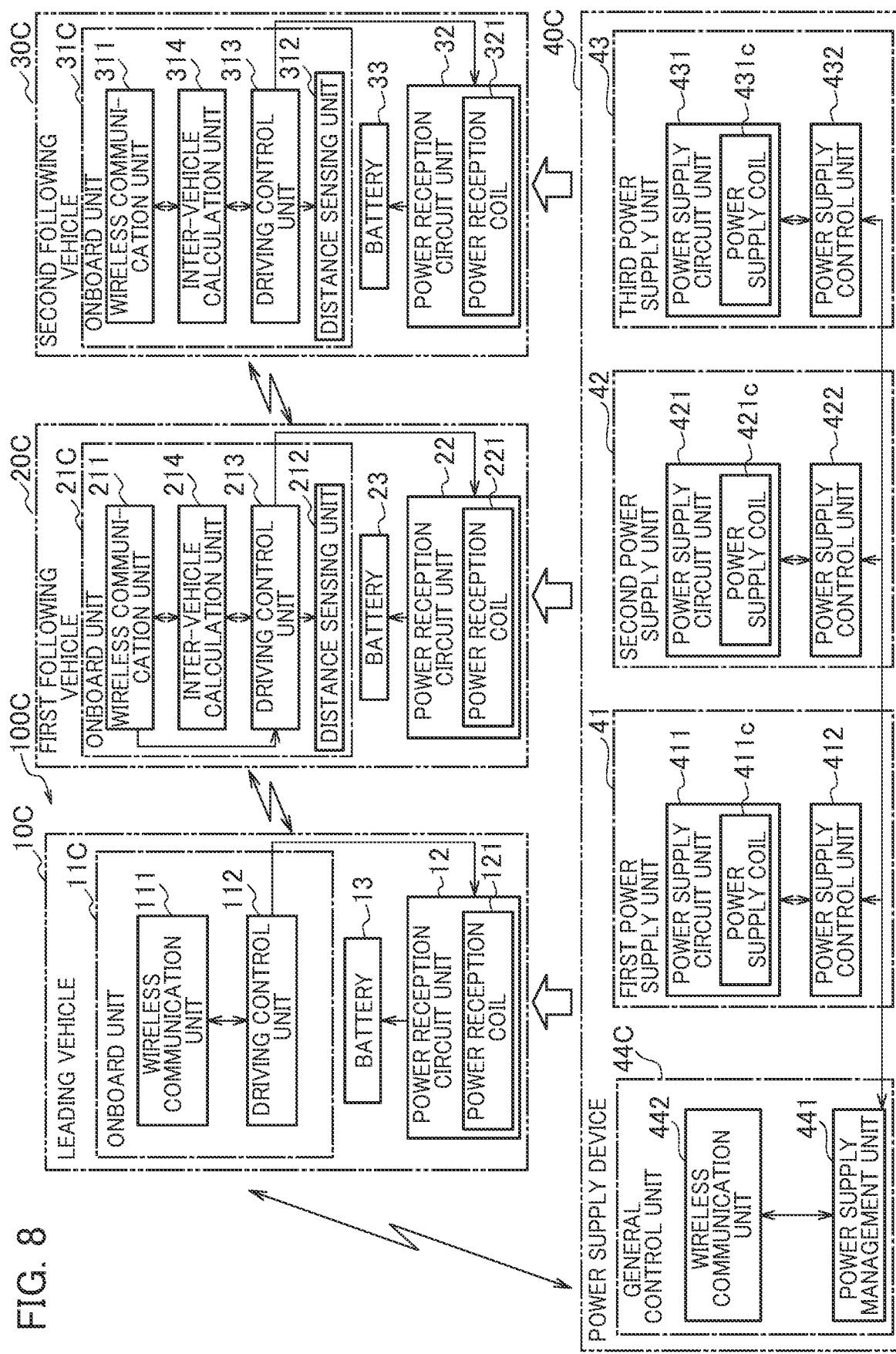
FIG. 8 is a block diagram illustrating a configuration of the power supply facility according to the third embodiment.

A configuration of a power supply facility according to a third embodiment is described below with reference to FIG. 8. The power supply facility 100C according to the present embodiment differs from the power supply facility 100A according to the first embodiment in including inter-vehicle calculation units 214 and 314 in the onboard unit 21C of the first following vehicle 20C and in the onboard unit 31C of the second following vehicle 30C, instead of including the inter-vehicle calculation unit 113 in the leading vehicle 10A. The other configurations are the same as those in the power supply facility 100A described in the first embodiment, and specific explanations regarding the elements having the same functions as those in the power supply facility 100A are not repeated below.

[Operations Executed in Power Supply Facility for Electric Vehicles According to Third Embodiment]

The operations executed in the power supply facility 100C according to the present embodiment are described below with the case where electric power is supplied to the leading vehicle 10C, the first following vehicle 20C, and the third following vehicle 30C traveling in line in this order.

The operations executed in the power supply facility 100C according to the present embodiment are described below with reference to the sequence diagram illustrated in FIG. 9. The driving control unit 112 of the onboard unit 11C of the leading vehicle 10C preliminarily stores information on the number of the vehicles traveling in line, which is "three" in this case. The inter-vehicle calculation unit 214 of the first following vehicle 20C stores a plurality of pieces of information including information indicating that the host vehicle 20C is the second vehicle in the vehicles traveling in line, information on the entire length X[1] of the leading vehicle 10C traveling contiguously ahead of the host vehicle 20C, information on the distance Y[1] from the front end of the leading vehicle 10C to the center of the power reception coil 121, and information on the distance Y[2] from the front end of the host vehicle 20C to the center of the power reception coil 221. The inter-vehicle calculation unit 314 of the second following vehicle 30C stores a plurality of pieces of information including information indicating that the host vehicle 30C is the third vehicle in the vehicles traveling in line, information on the entire length X[2] of the first following vehicle 20C traveling contiguously ahead of the host vehicle 30C, information on the distance Y[2] from the front end of the first following vehicle 20C to the center of the power reception coil 221, and information on the distance Y[3] from the front end of the host vehicle 30C to the center of the power reception coil 321.

The power supply management unit 441 included in the general control unit 44C of the power supply device 40C preliminarily stores, as the power supply coil interval information, information on the distance L1 between the center of the power supply coil 411c of the first power supply unit 41 and the center of the power supply coil 421c of the second power supply unit 42 and the distance L2 between the center of the power supply coil 421c of the second power supply unit 42 and the center of the power supply coil 431c of the third power supply unit 43.

In the present embodiment, when the leading vehicle 10C, the first following vehicle 20C, and the second following vehicle 30C traveling in line are supplied with electric power, the driver of the leading vehicle 10C drives toward the installed position of the power supply device 40C, and the first following vehicle 20C and the second following vehicle 30C follow the leading vehicle 10C.

When the vehicles 10C, 20C, and 30C approach the power supply device 40C, the driving control unit 112 of the onboard unit 11C of the leading vehicle 10C sends the request for the power supply coil interval information to the power supply device 40C via the wireless communication unit 111 (step S41). The driving control unit 112 also sends, together with the request, the preliminarily-stored information on the number of the vehicles traveling in line, which is "three", as the information on the number of the vehicles to be supplied with power. The power supply management unit 441 in the power supply device 40C acquires the request for the power supply coil interval information and the information on the number of the vehicles to be supplied with power, via the wireless communication unit 442.

The power supply management unit 441 sends the stored power supply coil interval information to the leading vehicle 10C in response to the request for the power supply coil interval information (step S42). The driving control unit 112 of the onboard unit 11C of the leading vehicle 10C acquires the power supply coil interval information sent from the power supply device 40C, and wirelessly sends the acquired information together with the power reception preparation instruction to the first following vehicle 20C via the wireless communication unit 111 (step S43). The driving control unit 112 then starts up the power reception circuit unit 12 to execute the power reception preparation processing (step S44).

The inter-vehicle calculation unit 214 in the first following vehicle 20C receives the information sent from the leading vehicle 10C via the wireless communication unit 211. The inter-vehicle calculation unit 214 then calculates the inter-vehicle distance CL1 between the leading vehicle 10C and the first following vehicle 20C in accordance with the power supply coil interval information acquired from the leading vehicle 10C and the preliminarily-stored information (X[1], Y[1], and Y[2]) (step S45).

The driving control unit 213 then acquires the inter-vehicle distance CL1 calculated by the inter-vehicle calculation unit 214, and changes the traveling speed while autonomously traveling in accordance with the information measured by the distance sensing unit 212 so as to adjust the speed of the host vehicle 20C to maintain the inter-vehicle distance CL1 to the leading vehicle 10C.

The driving control unit 213 starts up the power reception circuit unit 22 to execute the power reception preparation processing in accordance with the acquired power reception preparation instruction (step S46). The driving control unit 213 wirelessly sends the power supply coil interval information acquired from the leading vehicle 10C together with the power reception preparation instruction to the second following vehicle 30C via the wireless communication unit 211 (step S47).

The inter-vehicle calculation unit 314 in the second following vehicle 30C acquires the information sent from the first following vehicle 20C via the wireless communication unit 311. The inter-vehicle calculation unit 314 also calculates the inter-vehicle distance CL2 between the first following vehicle 20C and the second following vehicle 30C in accordance with the power supply coil interval information acquired from the first following vehicle 20C and the preliminarily-stored information (X[2], Y[2], and Y[3]) (step S48).

The driving control unit 313 then acquires the inter-vehicle distance CL2 calculated by the inter-vehicle calculation unit 314, and changes the traveling speed while autonomously traveling in accordance with the information measured by the distance sensing unit 312 so as to adjust the speed of the host vehicle 30C to maintain the inter-vehicle distance CL2 to the first following vehicle 20C.

The driving control unit 313 starts up the power reception circuit unit 32 to execute the power reception preparation processing in accordance with the acquired power reception preparation instruction (step S49). The driving control unit 313 then sends notification of power reception preparation completion to the first following vehicle 20C when detecting the completion of the power reception preparation processing executed by the power reception circuit unit 32 (step S50).

The driving control unit 213 in the first following vehicle 20C receives the notification of the power reception preparation completion sent from the second following vehicle 30C. The driving control unit 213 then notifies the leading vehicle 10C of power reception preparation completion of each of the second following vehicle 30C and the first following vehicle 20C when detecting the completion of the power reception preparation processing executed by the power reception circuit unit 22 of the host vehicle 20C (step S51). The following processing executed in steps S52 to S54 is the same as that in steps S11 to S13 described in the first embodiment, and specific explanations are not repeated below.

The power supply facility 100C, the leading vehicle 10C, and the following vehicles 20C and 30C described above in the third embodiment can implement a power supply system suitable for supplying power to the leading vehicle 10C and the following vehicles 20C and 30C travelling in line while maintaining this travelling state of the vehicles in the power supply facility 100C.

The third embodiment described above can achieve effects similar to those in the first embodiment while contributing to reducing the load of the calculation processing performed by the leading vehicle 10C.

While the first to third embodiments are described above with the case in which the leading vehicles 10A, 10B, and 10C directly communicate with the power supply devices 40A, 40B, and 40C, the mutual communication may be performed via a communication network by use of a Web application, for example.

The first to third embodiments are also described above with the case in which the leading vehicle is parked in the predetermined power supply space after the adjustment of the inter-vehicle distances between the vehicles when the vehicles are to be parked so as to be aligned with the corresponding power supply devices. The embodiments are not limited to this case, and the vehicles may adjust the inter-vehicle distances therebetween in a state in which the leading vehicle is parked in the predetermined power supply space and the following vehicles are also parked behind the leading vehicle.

While the first to third embodiments are described above with the case in which the number of the vehicles traveling in line is three, the number of the vehicles is not limited to this case and may be two or four or greater. When the number of the vehicles traveling in line is four or greater, the information sent and received between the first following vehicle and the second following vehicle is sequentially sent and received by the following vehicles after the third following vehicle.

The first to third embodiments are also described above with the case in which the power reception circuit units including the power reception coils are mounted on the lower surfaces of the respective electric vehicles, and the power supply units including the power supply coils of the power supply device are installed on the traveling road, but the embodiments are not limited to this case. For example, the power reception circuit units including the power reception coils may be installed on a side surface of each of the electric vehicles, and the power supply units including the power supply coils in the power supply device may be installed on a wall surface along the traveling road so that the power reception coils and the power supply coils are aligned to face each other. The set of the power reception circuit units and the power reception coils and the set of the power supply circuit units and the power supply coils each do not necessarily have an integrated structure. When the sets do not have an integrated structure, the installed position of the power reception circuit units is not limited to the inside of the respective electric vehicles, and the installed position of the power supply circuit units is not limited to the inside of the respective power supply units as long as the power reception coils and the power supply coils are aligned to face each other.

While the first to third embodiments are described above with the case in which the driver rides in the leading vehicle to execute the driving operation, the leading vehicle may be an autonomously driven driverless vehicle as in the case of the following vehicles. When the leading vehicle is an autonomously driven vehicle, the leading vehicle has a function of recognizing a specific marking (such as a box-shaped marking) corresponding to the power supply space so as to park in the power supply space while aligning a predetermined position of the vehicle body with the corresponding marking.

The first embodiment is described above with the case in which the inter-vehicle calculation unit is included in the leading vehicle, the second embodiment is described above with the case in which the inter-vehicle calculation unit is included in the power supply device, and the third embodiment is described above with the case in which the inter-vehicle calculation unit is included in each of the following vehicles. The embodiments are, however, not limited to these cases, and the inter-vehicle calculation unit may be provided in another device capable of communicating with the leading vehicle and the power supply device.

While certain embodiments have been described, these embodiments have been presented by way of example only, and are not intended to limit the scope of the inventions. Indeed, the novel embodiments described herein may be embodied in a variety of other forms; furthermore, various omissions, substitutions and changes in the form of the embodiments described herein may be made without departing from the spirit of the inventions. The accompanying claims and their equivalents are intended to cover such forms or modifications as would fall within the scope and spirit of the inventions.

What is claimed is:

1. A power supply facility for electric vehicles, the facility comprising:
    a wireless communication unit capable of wirelessly communicating with a plurality of electric vehicles traveling in line;
    a plurality of power supply coils installed at a predetermined interval so as to enable the plurality of electric vehicles to be parked in line from a front vehicle to an end vehicle and simultaneously supplied with electric power;
    a memory that stores instructions and a predetermined rule, and
    a processor that executes the instructions stored in the memory to:
        acquire, by an inter-vehicle calculation unit, a plurality of pieces of information including power supply coil interval information indicating a distance of the predetermined interval, information on an entire length of a vehicle body of each of the plurality of electric vehicles, and information on a position of a power reception coil installed in each of the vehicle bodies, and
        calculate, by the inter-vehicle calculation unit, an inter-vehicle distance for leading each of the plurality of electric vehicles to be parked in accordance with the acquired plurality of pieces of information so as to align the plurality of power supply coils with the power reception coils to face each other.

2. The power supply facility for electric vehicles according to claim 1, wherein the inter-vehicle calculation unit is provided in any of the plurality of electric vehicles, or is provided in a device capable of communicating with a power supply circuit unit including one of the plurality of power supply coils and with the plurality of electric vehicles.

3. An electric vehicle capable of traveling in line together with at least one following electric vehicle traveling contiguously behind the electric vehicle, the electric vehicle comprising:
    a memory that stores instructions and a predetermined rule;
    a processor that executes the instructions stored in the memory to:
        acquire, by an inter-vehicle calculation unit, a plurality of pieces of information including power supply coil interval information indicating a distance between a plurality of power supply coils installed at a predetermined interval so as to enable a plurality of electric vehicles parked contiguously in line from a front vehicle to an end vehicle to be simultaneously supplied with electric power, information on an entire length of a vehicle body of each of the electric vehicle and the at least one following electric vehicle, and information on a position of a power reception coil installed in each of the vehicle bodies, and
        calculate, by the inter-vehicle calculation unit, an inter-vehicle distance for leading the electric vehicle and the at least one following electric vehicle to be parked in accordance with the acquired plurality of pieces of information so as to align the plurality of power supply coils with the power reception coils to face each other; and
    a wireless communication unit configured to wirelessly send the calculated inter-vehicle distance to the at least one following electric vehicle.

4. An electric vehicle capable of following a leading vehicle traveling at a forefront of vehicles traveling in line, the electric vehicle comprising:
    a memory that stores instructions and a predetermined rule; and
    a processor that executes the instructions stored in the memory to:
        acquire, by an inter-vehicle calculation unit, a plurality of pieces of information including power supply coil interval information indicating a distance between a plurality of power supply coils installed at a predetermined interval so as to enable a plurality of electric vehicles parked contiguously in line from a front vehicle to an end vehicle to be simultaneously supplied with electric power, information on an entire length of a vehicle body of each of the electric vehicle and another electric vehicle traveling in front of the electric vehicle, and information on a position of a power reception coil installed in each of the vehicle bodies,
        calculate, by the inter-vehicle calculation unit, an inter-vehicle distance for leading the electric vehicle and the other electric vehicle traveling in line together with the electric vehicle to be parked in accordance with the acquired plurality of pieces of information so as to align the plurality of power supply coils with the power reception coils to face each other, and
        adjust, by a driving control unit, the inter-vehicle distance to the other electric vehicle by autonomous traveling in accordance with the inter-vehicle distance calculated by the inter-vehicle calculation unit.

5. A power supply method for electric vehicles, the method comprising:

causing an inter-vehicle calculation unit connected through wireless communication to a plurality of electric vehicles traveling in line to acquire a plurality of pieces of information including power supply coil interval information indicating a distance between a plurality of power supply coils installed at a predetermined interval so as to enable the plurality of electric vehicles to be parked in line from a front vehicle to an end vehicle and simultaneously supplied with electric power, information on an entire length of a vehicle body of each of the plurality of electric vehicles, and information on a position of a power reception coil installed in each of the vehicle bodies, and calculate an inter-vehicle distance for leading each of the plurality of electric vehicles to be parked in accordance with the acquired plurality of pieces of information so as to align the plurality of power supply coils with the power reception coils to face each other;

causing a following vehicle, among the plurality of electric vehicles, autonomously traveling and following a leading vehicle to adjust the inter-vehicle distance to an electric vehicle traveling contiguously in front thereof in accordance with the inter-vehicle distance calculated by the inter-vehicle calculation unit; and causing each of the plurality of power supply coils to start supplying electric power to each of the plurality of electric vehicles when the power reception coils and the plurality of power supply coils are aligned to face each other after the leading vehicle among the plurality of electric vehicles is parked so that a first power reception coil of the leading vehicle is aligned with a front power supply coil of the plurality of power supply coils to face each other.

* * * * *